3,040,092
HYDROGENATION OF A-NOR-B-HOMO-STEROIDS AND COMPOUNDS THEREOF

Georges Muller, Nogent-sur-Marne, and André Poittevin, Les Lilas, France, assignors, by mesne assignments, to Roussel-UCLAF, S.A., Paris, France, a corporation of France
No Drawing. Filed Nov. 1, 1961, Ser. No. 149,220
Claims priority, application France Apr. 10, 1961
12 Claims. (Cl. 260—488)

The invention relates to a process for the reduction of A-nor-B-homo-Δ5(10)-steroids and in particular the reduction of A-nor-B-homo-Δ5(10)-steroids having the formula

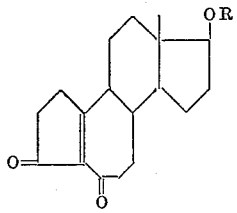

wherein R is an acyl radical of an organic carboxylic acid having 2 to 7 carbon atoms. The invention also relates to the novel compounds, 17β-acyloxy-A-nor-B-homo-5ξ, 10ξ-estrane-3-one and 17β-acyloxy-A-nor-B-homo-5ξ, 10ξ-estrane-3ξ,6ξ-diol which posses androgenic, anabolic and progestomimetic activity.

It is an object of the invention to porvide novel processes for the reduction of A-nor-B-homo-Δ5(10)-steroids of Formula I.

It is another object of the invention to provide the novel steroids, 17β-acyloxy-A-nor-B-homo-5ξ,10ξ-estrane-3-one and 17β-acyloxy-A-nor-B-homo-5ξ,10ξ-estrane-3ξ,6ξ-diol.

These and other objects and advantages of the invention will become obvious from the following detailed description.

One of the processes of the invention comprises catalytically hydrogenating 17β-acyloxy-A-nor-B-homo-Δ5(10)-estrene-3,6-dione in an inert solvent to form 17β-acyloxy-A-nor-B-homo-5ξ,10ξ-estrane-3-one and recovering said compound. The hydrogenation is preferably effected with hydrogen in the presence of palladized carbon black at room temperatures in a lower alkanol such as methanol or ethanol.

Another mode of the processes of the invention comprises reducing 17β-acyloxy-A-nor-B-homo-Δ5(10)-estrene-3,6-dione with an alkali metal borohydride in an inert solvent under alkaline conditions to form 17β-acyloxy-A-nor-B-homo-5ξ,10ξ-estrane-3ξ,6ξ-diol and recovering the latter. The reduction is preferably effected with potassium borohydride in a lower alkanol such as methanol at temperatures in the neighborhood of 10° C.

TABLE I

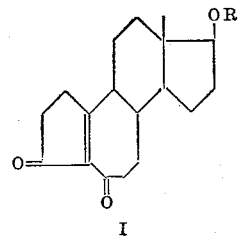

I

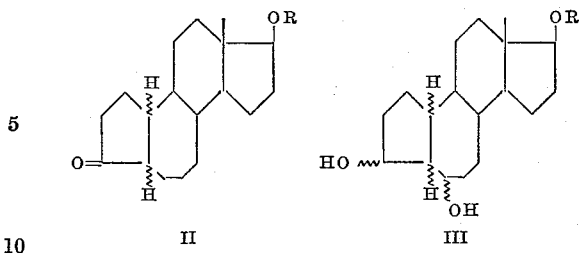

II    III wherein R is an acyl radical of an organic carboxylic acid having 2 to 7 carbon atoms.

The acyl radical of the compounds of Formula I may be derived from an organic carboxylic acid having 2 to 7 carbon atoms. Examples of suitable acids are acetic acid, propionic acid, butyric acid, isobutyric acid, valeric acid, isovaleric acid, trimethyl acetic acid, methylethyl acetic acid, caproic acid, heptanoic acid and benzoic acid.

In the following examples there are described several preferred embodiments to illustrate the invention. However, it should be understood that the invention is not intended to be limited to the specific embodiments.

The melting points are instantaneous melting points determined on the Kofler block and the temperatures in the examples are in degrees centigrade.

*Example 1.—Preparation of 17β-Acetoxy-A-nor-B-Homo-5ξ,10ξ-Estrane-3-One*

STEP A.—PREPARATION OF CATALYST

To 1.5 cc. of a 20% solution of palladium chloride in water there were added 30 cc. of distilled water and 3 grams of activated carbon black. This suspension was saturated with hydrogen and then vacuum filtered.

STEP B.—HYDROGENATION 3 grams of 17β-acetoxy-A-nor-B-homo-Δ5(10)-estrene-3,6-dione were dissolved in 60 cc. of ethanol. The catalyst prepared as indicated in step A was added. Then the mixture was hydrogenated for a period of six hours until the reaction stopped. The catalyst was removed by filtration and was washed with alcohol. The alcoholic solutions were combined and evaporated to dryness under vacuum.

The residue was dissolved in 30 cc. of benzene and the benzenic solution was poured through a chromatography column containing 150 grams of alumina. The column was eluted with 400 cc. of benzene and the benzenic eluate was evaporated to dryness. 1.47 grams of raw product were obtained, which was recrystallized from a mixture of isopropyl ether and petroleum ether. 264 milligrams of product melting at 162° C. were recovered from the first crystallization.

A new crystallization from isopropyl ether did not modify the melting point. The 17β-acetoxy-A-nor-B-homo-5ξ,10ξ-estrane-3-one occurred in the form of colorless prismatic crystals and was very soluble in alcohol, ether, acetone, benzene and chloroform. The said product had the following physical constants: melting point of 162° C., specific rotation $[\alpha]_D^{20}=-6°$ C. (c.=0.5% in chloroform).

The infrared spectrum of the compound showed the absence of hydroxyl groups, the presence of an acetate band and the presence of a ketone function.

*Analysis.*—$C_{20}H_{30}O_3$; molecular weight—318.44. Calculated: C, 75.4%; H, 9.5%; O, 15.07%. Found: C, 75.4%; H, 9.4%; O, 15.4%.

This compound is new.

The starting compound was obtained according to the process described in commonly assigned U.S. patent application Serial No. 149,223, filed on even date herewith.

*Example II.—Preparation of 17β-Acetoxy-A-Nor-B-Homo-5ξ, 10ξ-Estrane-3ξ, 6ξ-Diol*

0.500 gram of potassium borohydride and 20 cc. of methanol were introduced into a conical flask. The suspension was cooled to 0° C. and 1 gram of 17β-acetoxy-A-nor-B-homo-$\Delta^{5(10)}$-estrene-3,6-dione was added in small portions while maintaining the temperature at 5° C. The mixture was agitated for a period of three hours at a temperature in the neighborhood of 10° C. 10 cc. of water were then added and the suspension was extracted with methylene chloride. The chloromethylene phase was decanted, washed with water, dried over magnesium sulfate, and distilled to dryness. The dry residue was recrystallized from isopropyl ether. 710 milligrams of raw 17β-acetoxy-A-nor-B-homo-5ξ, 10ξ-estrane-3ξ 6ξ-diol melting at 104° C. were thus obtained.

The raw product was redissolved in 20 cc. of methylene chloride and subjected to chromatography on a column containing 70 grams of alumina. The column was eluted successively with methylene chloride, with methylene chloride containing 0.5% of methanol and then with methylene chloride containing 2% of methanol. This last fraction was distilled to dryness and recrystallized from isopropyl ether giving 240 milligrams of pure product melting at 154° C. A new recrystallization from ether did not modify the melting point.

The product occurred in the form of colorless prismatic crystals, soluble in alcohol, acetone, benzene and chloroform, slightly soluble in ether.

*Physical constants.*—Melting point=154° C. Specific rotation $[\alpha]_D^{20}=+8°$ C. (c.=0.5% in chloroform).

*Analysis.*—$C_{20}H_{32}O_4$; molecular weight=336.46. Calculated: C, 71.39%; H, 9.59%. Found: C, 71.2%; H, 9.5%.

Chromatography on paper and resolution by the reactant formed from 9 volumes of a solution containing 10% of antimony trichloride in chloroform and 1 volume of thionyl chloride showed the homogeneousness of the product.

The compound is new.

Various modifications of the process of the invention may be made without departing from the spirit or scope thereof, and it is to be understood that the invention is to be limited only as defined in the appended claims.

We claim:

1. A compound having the formula

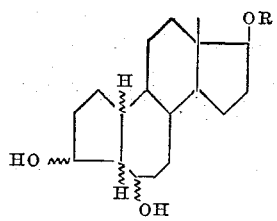

wherein R is an acyl radical of an organic hydrocarbon carboxylic acid having 2 to 7 carbon atoms.

2. 17β-acetoxy-A-nor-B-homo-5ξ, 10ξ-estrane-3ξ, 6ξ-diol.

3. A compound having the formula

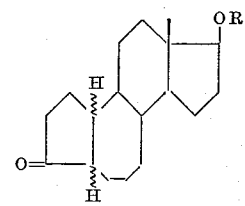

wherein R is an acyl radical of an organic hydrocarbon carboxylic acid having 2 to 7 carbon atoms.

4. 17β-acetoxy-A-nor-B-homo-5ξ, 10ξ-estrane-3-one.

5. A process for the preparation of a compound having the formula

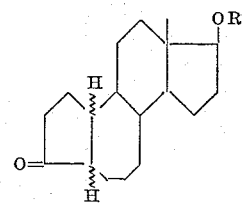

wherein R is an acyl radical of an organic hydrocarbon carboxylic acid having 2 to 7 carbon atoms which comprises catalytically hydrogenating 17β-acyloxy-A-nor-B-homo-$\Delta^{5(10)}$-estrene-3,6-dione wherein the acyl group is derived from an organic carboxylic acid having 2 to 7 carbon atoms in an inert solvent to form a compound of the above formula and recovering the same.

6. The process of claim 5 wherein R is an acetyl group.

7. The process of claim 5 wherein the hydrogenation is effected in the presence of palladized carbon black at room temperature in a lower alkanol.

8. A process for the preparation of a compound having the formula

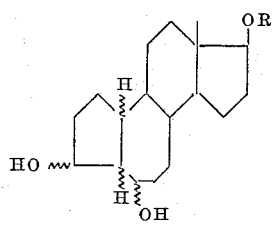

wherein R is an acyl radical of an organic hydrocarbon carboxylic acid having 2 to 7 carbon atoms which comprises reducing 17β-acyloxy-A-nor-B-homo-$\Delta^{5(10)}$-estrene-3,6-dione wherein the acyl radical is derived from an organic carboxylic acid having 2 to 7 carbon atoms with an alkali metal mixed hydride under alkaline conditions to form a compound of the above formula and recovering said compound.

9. The process of claim 8 wherein the reduction is effected with an alkali metal borohydride in an inert organic solvent.

10. The process of claim 8 wherein R is an acetyl group.

11. A process for the preparation of 17β-acetoxy-A-nor-B-homo-5ξ, 10ξ-estrane-3-one which comprises catalytically hydrogenating 17β-acetoxy-A-nor-B-homo-$\Delta^{5(10)}$-estrene-3,6-dione in ethanol in the presence of palladized carbon black at room temperature and recovering said compound.

12. A process for the preparation of 17β-acetoxy-A-nor-B-homo-5ξ, 10ξ-estrane-3ξ, 6ξ-diol which comprises reducing 17β-acetoxy-A-nor-B-homo-$\Delta^{5(10)}$-estrene-3,6-dione in methanol with potassium borohydride and recovering said product.

No references cited.

UNITED STATES PATENT OFFICE
CERTIFICATE OF CORRECTION

Patent No. 3,040,092            June 19, 1962

Georges Muller et al.

It is hereby certified that error appears in the above numbered patent requiring correction and that the said Letters Patent should read as orrected below.

Column 1, lines 54 to 64, and column 2, lines 1 to 10, TABLE I, the formulas should appear as shown below instead of as in the patent:

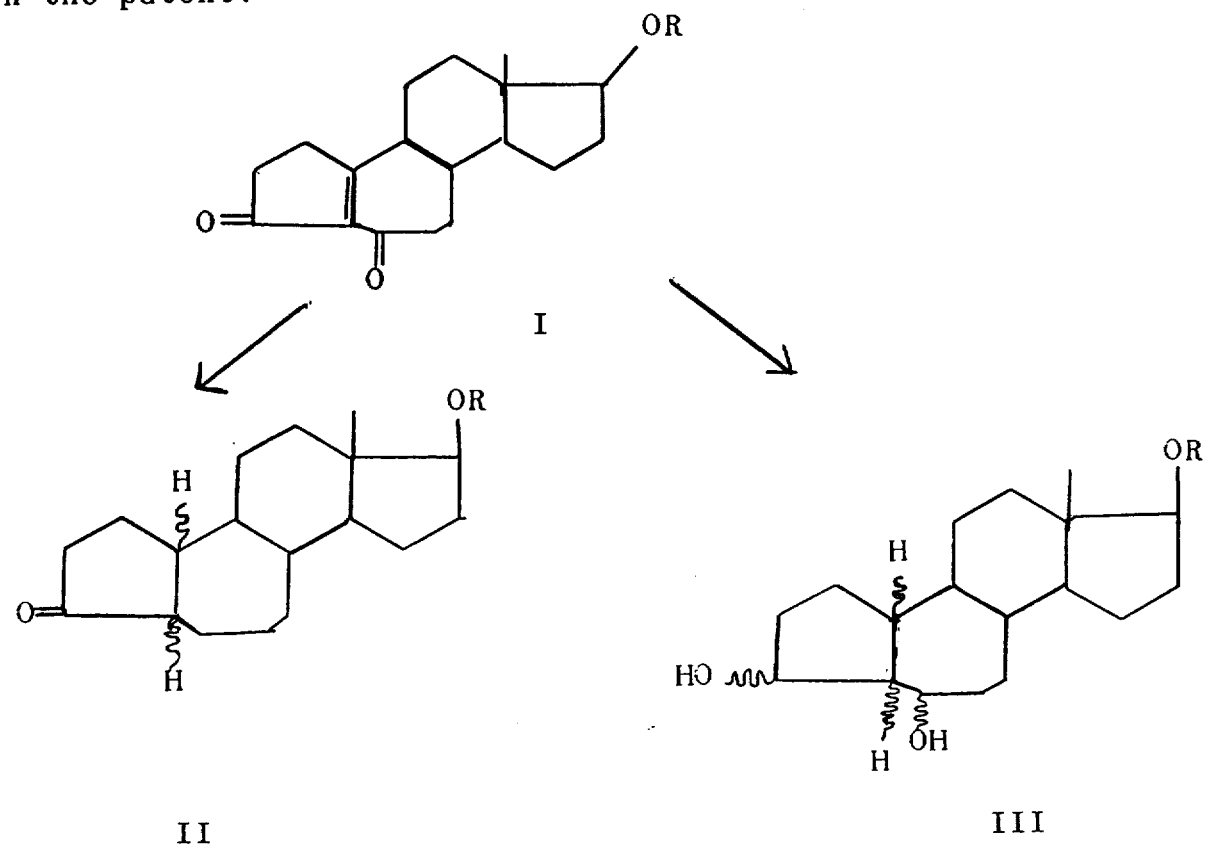

II            III

Signed and sealed this 20th day of November 1962

(SEAL)
Attest:

ERNEST W. SWIDER

Attesting Officer

DAVID L. LADD
Commissioner of
Patents